(12) United States Patent
Hall

(10) Patent No.: US 8,660,565 B2
(45) Date of Patent: Feb. 25, 2014

(54) WIRELESS FAULT MONITORING SYSTEM

(75) Inventor: David Hall, Staffordshire (GB)

(73) Assignee: Handicare Accessibility Limited (GB)

(*) Notice: Subject to any disclaimer, the term of this patent is extended or adjusted under 35 U.S.C. 154(b) by 1240 days.

(21) Appl. No.: 12/090,587

(22) PCT Filed: Oct. 16, 2006

(86) PCT No.: PCT/GB2006/003825
§ 371 (c)(1),
(2), (4) Date: Jun. 18, 2008

(87) PCT Pub. No.: WO2007/045837
PCT Pub. Date: Apr. 26, 2007

(65) Prior Publication Data
US 2008/0268831 A1    Oct. 30, 2008

(30) Foreign Application Priority Data
Oct. 21, 2005  (GB) .................................. 0521428.3

(51) Int. Cl.
*H04W 40/00*  (2009.01)
*H04W 72/00*  (2009.01)

(52) U.S. Cl.
USPC .................. 455/447; 455/450; 455/452.1

(58) Field of Classification Search
USPC ........... 455/466, 90.1, 404.1, 414.1; 340/438, 340/539.1–539.18, 648, 665–667, 340/539.1–539.15, 539.1–539.12, 539.14; 187/200–202, 390, 391–394
See application file for complete search history.

(56) References Cited

U.S. PATENT DOCUMENTS 5,961,561 A  10/1999  Wakefield, II
6,154,690 A  11/2000  Coleman
(Continued)

FOREIGN PATENT DOCUMENTS

DE  100 32 865  1/2002
DE  100 44 658  3/2002
(Continued)

OTHER PUBLICATIONS

"An Elevator Remote Supervisory Control System Based on PSTN and Mobile Communication" by Li Tao et al.; Published in the Journal of Electronic Technology, No. 9 2004; pp. 81-83; Total of four (4) pages including the Statement of Relevance page; Dated Sep. 2004.

(Continued)

*Primary Examiner* — George Eng
*Assistant Examiner* — Nam Huynh
(74) *Attorney, Agent, or Firm* — Clark Hill PLC

(57) ABSTRACT

If a mobility aid develops a problem, the person controlling the aid may be unable to move or request assistance or call for help. Furthermore, even if someone was alerted to their predicament, that person may not be able to identify and thus rectify the problem expediently without expert assistance. A system (10) for monitoring for a fault in a mobility aid (12) includes a fault detector for detecting a fault in the mobility aid. The system also includes a signal generator (14) for generating a signal representative of the fault is also provided. A wireless transmitter (16) for transmitting fault signal, and a wireless receiver (18) for receiving the fault signal are also provided. The receiver is also operable for causing an alert to be sent to an operator that the mobility aid (12) requires attention.

17 Claims, 1 Drawing Sheet

(56) References Cited

U.S. PATENT DOCUMENTS

| | | | |
|---|---|---|---|
| 6,246,325 B1 * | 6/2001 | Chittipeddi | 340/540 |
| 6,650,244 B1 | 11/2003 | Chen et al. | |
| 6,659,230 B1 * | 12/2003 | Jenkins | 187/202 |
| 6,703,930 B2 * | 3/2004 | Skinner | 340/539.11 |
| 6,998,995 B2 * | 2/2006 | Nakajima | 340/686.1 |
| 7,002,462 B2 * | 2/2006 | Welch | 340/506 |
| 7,073,633 B2 | 7/2006 | Weinberger et al. | |
| 7,206,834 B1 * | 4/2007 | Barth | 709/224 |
| 7,558,564 B2 * | 7/2009 | Wesby | 455/419 |
| 7,761,080 B2 * | 7/2010 | Banet et al. | 455/404.1 |
| 2002/0067282 A1 | 6/2002 | Moskowitz et al. | |
| 2002/0123832 A1 | 9/2002 | Gotvall et al. | |
| 2003/0114965 A1 | 6/2003 | Fiechter et al. | |
| 2004/0009772 A1 | 1/2004 | Mazzara, Jr. | |
| 2004/0094366 A1 | 5/2004 | Weinberger et al. | |

FOREIGN PATENT DOCUMENTS

| | | |
|---|---|---|
| EP | 986 239 | 3/2000 |
| EP | 1 249 806 | 10/2002 |
| EP | 1355278 A1 | 10/2003 |
| EP | 1 391 861 | 2/2004 |
| GB | 2 226 428 | 6/1990 |
| GB | 2 312 057 | 10/1997 |
| GB | 2312057 | 10/1997 |
| GB | 2312057 A * | 10/1997 |
| GB | 2 357 389 | 6/2001 |
| GB | 2 385 183 | 8/2003 |
| GB | 2 388 194 | 11/2003 |
| GB | 2 425 361 | 10/2006 |
| JP | 4-235881 | 8/1992 |
| JP | 2002-370882 | 12/2002 |
| JP | 2003-259022 | 9/2003 |
| JP | 2005-206309 | 8/2005 |
| RU | 94039172 | 10/1996 |
| RU | 2240657 | 11/2004 |
| WO | WO 9530216 | 11/1995 |
| WO | 99/29611 | 6/1999 |
| WO | 99/49660 | 9/1999 |
| WO | 00/60546 | 10/2000 |
| WO | 00/79500 | 12/2000 |
| WO | 01/48722 | 7/2001 |
| WO | 01/89903 | 11/2001 |
| WO | WO 0229567 A1 | 4/2002 |
| WO | WO 02062271 A1 | 8/2002 |
| WO | 03/028300 | 4/2003 |
| WO | 2005/039930 | 5/2005 |
| WO | WO 2005085021 A1 | 9/2005 |

OTHER PUBLICATIONS

International Preliminary Report on Patentability; Dated Apr. 22, 2008; Seven (7) Pages.
Japanese Search Report, dated Feb. 28, 2012, and translation thereof. (6 pages).
Yorkshire Post, "Firm Aims to Increase Jobs and Turnover with Intelligent Home Stairlift of Future", Apr. 18, 2012, www.yorkshirepost.co.uk/business/business-news/firm-aims-to-increase-jobs-and-turnover-with-inelligent-home-stairlift-of-future-1-2531627[Apr. 18, 2012 16:28:20].

* cited by examiner

WIRELESS FAULT MONITORING SYSTEM

This application is a National Phase filing of PCT/GB2006/003825, having an International filing date of Oct. 16, 2006, which disclosure is herein incorporated by reference.

BACKGROUND OF THE INVENTION

The present invention relates to a wireless system for monitoring for a fault in a mobility aid and, in particular but not exclusively, to fault monitoring in stairlifts. The present invention further relates to the correction of a fault in a mobility aid and, in particular but not exclusively, to correcting faults in stairlifts.

A variety of mobility aids are available for people who are elderly, or who are suffering from a disability or long-term health problems, and who can find it difficult or impossible to move around. Wheelchairs, mobility scooters and stairlifts are just a few examples of the types of mobility aids that can assist people in moving about either inside or outside.

However, if the mobility aid were to develop a problem, the situation may arise where the person controlling the aid was unable to move, and they could be rendered immobile and may be stranded if they are outside. This could leave them in the situation where they are unable to request assistance or call for help. Furthermore, even if someone else was alerted to their predicament, that person may not be able to identify and thus rectify the problem expediently without expert assistance.

It is an aim of the present invention to provide a wireless fault monitoring system for a mobility aid that alleviates the aforementioned problems.

BACKGROUND OF THE INVENTION

According to the present invention there is provided a system for monitoring for a fault in a mobility aid. Preferably, the mobility aid is a stairlift.

It is an advantage that the present invention provides a wireless fault monitoring system that continually monitors for faults in a mobility aid, and automatically sends an alert to a person or entity for action.

It is a further advantage that the transmission of the fault signal is automatic, as no action is required by the user of the mobility aid, who may not in fact be able to reach a telephone or other communications devices.

In one embodiment of the invention, the fault signal comprises a code indicative of the type of fault that has occurred.

The transmitter may be located in the mobility aid, with the receiver being located remotely from the transmitter.

In an embodiment of the invention, the fault signal is an SMS message. In a preferred embodiment, the receiver is a GSM or GPRS network operator. Preferably, the system further comprises a destination server. More preferably, the server is an SMS server. The GSM/GPRS operator may be operable for transmitting the SMS message to the SMS server, which can then transmit the alert to the operator.

In an embodiment of the invention, the wireless transmitter is also operable as a receiver for receiving data to correct or control the stairlift, and the wireless receiver is also operable as a transmitter for transmitting data to the stairlift.

It is an advantage that embodiments of the present invention provide a wireless fault correction system that operates via two-way communication to correct a fault that has been detected either temporarily or permanently by remote means.

It is a further advantage that embodiments of the present invention provide a means of controlling the stairlift via wireless communication to allow emergency egress from the stairway on instruction and control of a user of the stairlift.

In another embodiment, the system further comprises a panic button. The system may further comprise audio and/or visual communications devices that allow a user of the stairlift to speak to and/or see an operator.

It is an advantage that the operator knows the nature of the fault, so he/she can ensure that the fault is dealt with efficiently.

An embodiment of the invention will now be described by way of example with reference to the following drawings, wherein:

DETAILED DESCRIPTION

Figure 1:
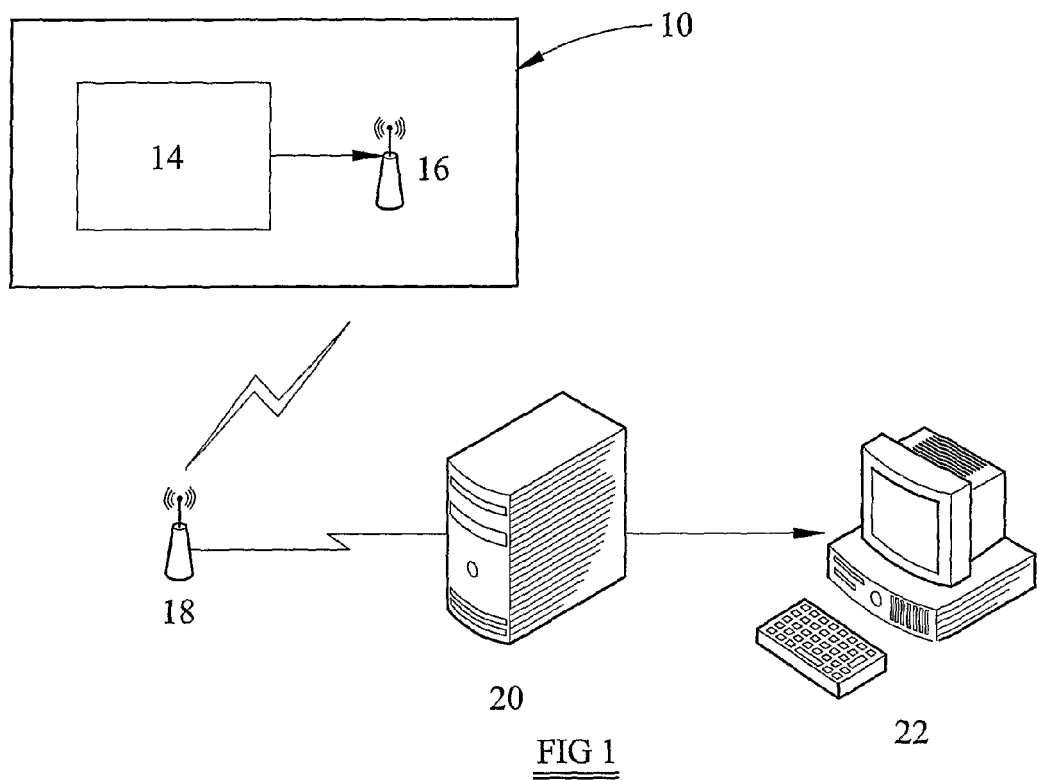
FIG. 1 is a schematic view of the system according to the present invention.
Figure 2:
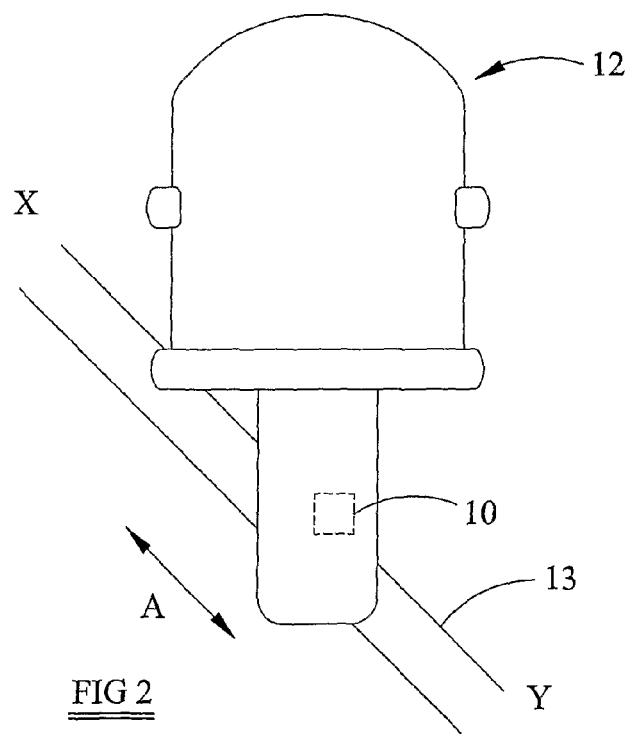
FIG. 2 is an illustration of the system of the present invention in use in a stairlift.

Referring to FIGS. 1 and 2, a fault monitor system 10 is mounted in a stairlift 12. The stairlift 12 is mounted on, and can move along, a rail 13 in the directions of arrow A, and between end points X and Y.

The monitor 10 comprises a control board 14, which generates a signal in the form of a fault code (described in more detail below) when a fault develops in the stairlift 12. The monitor 10 also comprises a transmitter 16. The transmitter 16 can wirelessly communicate with a receiver 18, which is located remotely from the transmitter 16. The receiver 18 receives the transmitted signal from the transmitter 16, and transmits it to a destination server 20. The server 20 transmits the signal to a computer 22.

With reference to FIG. 2, in normal use the stairlift 12 can move up and down a set of stairs (not shown) in the directions indicated by arrow A and between end points X and Y. The monitor 10 continually monitors for the presence of faults in the stairlift 12. The monitor 10 can check, for example, whether the stairlift 12 starts moving when instructed to by a user, that it continues moving between the start and end points X and Y, and that it stops at the end point. If the stairlift 12 develops a fault, such that one or more of these (or other) conditions is not met, the monitor 10 detects the fault and generates a fault code.

The control board 14 carries out the fault detection process by continually performing checks on the stairlift 12 and its environment, through the use of conventional "if", "do" and "while" algorithms.

The fault code is representative of the type of fault that has occurred, and corresponds to one of a predetermined set of fault codes that indicate particular faults in the stairlift 12. For example, if the stairlift 12 fails to start moving when instructed to, this could be due to a failed electrical connection between the start switch (not shown) and the motor (also not shown) that powers the stairlift 12, or perhaps a mechanical fault in the mounting of the stairlift 12 on the rail 13. The motor brake circuit, leading edge safety switches, Over Speed Governor (OSG) safety switch, and seat swivel switch, for example, may also be monitored. The fault code serves to provide an indication of where the fault occurred, and why.

The fault code is communicated from the control board 14 to the transmitter 16. A signal containing the fault code is then automatically and wirelessly transmitted by the transmitter 16 to the remote receiver 18. The wireless transmission is via a Short Message Service (SMS) text message. The receiver 18 is either a GSM (Global System for Mobile communications) or GPRS (General Packet Radio Service) network receiver. That is, the system 10 can function in combination with current second and third generation cellular wireless technologies. The control board comprises a SIM card, so that when a fault signal is sent, the telephone number from which the signal originates from identifies the location of the fault.

The fault code signal is then passed from the receiver 18 to the destination SMS server 20. The server 20 then passes the fault code signal to a customer services operator who is using computer station 22. There may be several computer stations 22 in communication with the server 20. Therefore, the server 20 can receive fault code signals from a large number of users, and a filter may be employed so as to direct a particular type of fault codes to a particular customer services operator on a particular computer 22.

On receiving the fault code on the computer 22, the customer services operator can immediately arrange for an engineer or repairer to visit the stairlift 12 that has developed the fault.

In an embodiment of the invention, the fault monitor system enables two-way communication between the control board 14 and the receiving server 20. In this embodiment, the fault code signal is transmitted to the server 20 as previously described. The receiving server 20 uses software to analyse the signal and determine the next action required.

The possible next actions are as follows:

i) The software determines that more information is required before the next action can be determined. The server 20 then creates a TCP/IP connection with the control board 14 through a GSM/GPRS/3G or other mobile telephony system that supports this connection type via the transmitter 16 and receiver 18 which are both operable as transmitters and receivers. Once a connection is established, the server 20 communicates directly with the control board 14, to download any function and fault history that is stored. The software on the server 20 then analyses this data in order to determine the next action that is required.

ii) The software determines from the fault code that an engineer visit is necessary to repair the fault. A visit is then arranged automatically by the software, raising a job in any relevant computerised engineer management systems being employed. Alternatively, a digital message is passed to a customer services operator using the computer 22.

iii) The software determines from the fault code that a customer services operator needs to contact the user of the stairlift. A call is then arranged automatically by the software, raising a job in any relevant computerised customer services management systems being employed. Alternatively, a digital message is passed to a customer services operator using the computer 22.

iv) The software may determine that the fault can be fixed remotely either permanently or temporarily. The customer services operator then remotely accesses the stairlift by using the server 20 to create a TCP/IP or other connection type with the control board 14 through a GSM/GPRS/3G or other mobile telephony system that supports this connection type via the transmitter 16 and receiver 18. Once a connection is established, the customer services operator can remotely control the functionality of the lift and override safety circuits as necessary to correct the fault.

Other two-way communication devices are employed in further embodiments of the invention. A simple 'panic' button (not shown in the Figures) may be provided, which the stairlift user can press in an emergency situation. When the stairlift user presses this button, an SMS signal is sent to any pre-programmed number with a pre-programmed message.

Alternatively, the system could be improved to incorporate audio and visual communication such that the stairlift user could speak to and see an operator or an emergency contact. On receiving a request from the stairlift user, or fault notification from the lift, the operator/contact could use the system to see if the stairlift user is or is not in distress on the lift. This system could incorporate a host of methods for communication including input devices, such as keyboards or specific input buttons, and output devices such as LCD displays or other future visual presentation devices, to send information to the stairlift user.

The system can also be employed to update the software on the control board. If a software upgrade is available, the server 20 could establish a remote connection with the control board 14 by any available method and then transmit the updated software.

The present invention has been described in relation to stairlifts. However, the invention can also be utilised in other mobility aids, such as wheelchairs and power scooters for example. In such applications, where the mobility aid is moveable, Global Positioning Satellite (GPS) technology can be employed in order to provide an operator/contact with information on the location of the mobility aid in the event of a fault.

The invention claimed is:

1. A system for monitoring for a fault in a stairlift, comprising:
   a fault detector, located in the stairlift, for detecting a fault in the stairlift;
   a signal generator, located in the stairlift, for generating a signal representative of the fault;
   a wireless transmitter, located in the stairlift, for transmitting the fault signal;
   a wireless receiver, located remotely from the wireless transmitter, for receiving the fault signal;
   wherein the receiver is further operable for causing an alert to be sent to an operator that the stairlift requires attention; and
   wherein the fault detector checks whether the stairlift starts moving when instructed to by a user, that it continues moving between a start and an end point, and that it stops at the end point.

2. The system of claim 1, wherein the fault signal comprises a code indicative of the type of fault that has occurred.

3. The system of claim 2, and further comprising a filter operable for directing a particular type of fault code to a particular customer services operator on a particular computer.

4. The system of claim 1, wherein the fault signal is an SMS message.

5. The system of claim 4, wherein the receiver is a GSM or GPRS network operator.

6. The system of claim 5, further comprising a destination SMS server, the GSM/GPRS operator being operable for transmitting the SMS message to the SMS server for transmitting the alert to the operator.

7. The system of claim 6, configured for two-way communication between the fault detector and the SMS server and wherein the SMS server uses software to analyze the signal representative of the fault and determine the next action required.

8. The system of claim 7, wherein the software determines one of:
   that more information is required before the next action can be determined;

that an engineer visit is necessary to repair the fault;
that a customer services operator needs to contact the user of the mobility aid;
that the fault can be fixed remotely either permanently or temporarily.

9. The system of claim 6, wherein the SMS server is operable for establishing a remote connection with the fault detector and for transmitting a software upgrade thereto.

10. The system of claim 1, wherein the wireless transmitter is also operable as a receiver for receiving data to correct or control the stairlift, and the wireless receiver is also operable as a transmitter for transmitting data to the stairlift.

11. The system of claim 1, further comprising a panic button.

12. The system of claim 11, wherein, when the user of the stairlift presses the panic button, an SMS signal is sent to any pre-programmed number with a pre-programmed message.

13. The system of claim 1, further comprising audio and/or visual communications devices that allow a user of the stairlift to speak to and/or see an operator.

14. The system of claim 1, wherein the fault detector continually monitors for the presence of faults in the mobility aid stairlift.

15. A system for monitoring for a fault in a mobility aid, comprising:
a fault detector, located in the mobility aid, for detecting a fault in the mobility aid;
a signal generator, located in the mobility aid, for generating a signal representative of the fault in the form of an SMS message;
a wireless transmitter, located in the mobility aid, for transmitting the fault signal;
a wireless receiver, located remotely from the wireless transmitter, for receiving the fault signal; and
a destination SMS server,
wherein the system is configured for two-way communication between the fault detector and the SMS server and
wherein the SMS server uses software to analyze the signal representative of the fault and determine the next action required, and
wherein the receiver is a GSM or GPRS network operator operable for transmitting the SMS message to the SMS server and for causing an alert to be sent to an operator that the mobility aid requires attention.

16. The system of claim 15, wherein the software determines one of:
(i) that more information is required before the next action can be determined;
(ii) that an engineer visit is necessary to repair the fault;
(iii) that a customer services operator needs to contact the user of the mobility aid;
(iv) that the fault can be fixed remotely either permanently or temporarily.

17. A system for monitoring for a fault in a mobility aid, comprising:
a fault detector, located in the mobility aid, for detecting a fault in the mobility aid;
a signal generator, located in the mobility aid, for generating a signal representative of the fault in the form of an SMS message;
a wireless transmitter, located in the mobility aid, for transmitting the fault signal;
a wireless receiver, located remotely from the wireless transmitter, for receiving the fault signal; and
a destination SMS server,
wherein the system is configured for two-way communication between the fault detector and the SMS server,
wherein the receiver is a GSM or GPRS network operator operable for transmitting the SMS message to the SMS server and for causing an alert to be sent to an operator that the mobility aid requires attention, and
wherein the SMS server is operable for establishing a remote connection with the fault detector and for transmitting a software upgrade thereto.

* * * * *

UNITED STATES PATENT AND TRADEMARK OFFICE
CERTIFICATE OF CORRECTION

PATENT NO.      : 8,660,565 B2                                                    Page 1 of 1
APPLICATION NO. : 12/090587
DATED           : February 25, 2014
INVENTOR(S)     : David Hall It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1485 days.

Signed and Sealed this

Twenty-ninth Day of September, 2015

Michelle K. Lee
*Director of the United States Patent and Trademark Office*